US010666361B2

(12) United States Patent
Hyakudai et al.

(10) Patent No.: US 10,666,361 B2
(45) Date of Patent: May 26, 2020

(54) SENDING CONTROL APPARATUS, SENDING CONTROL METHOD, SIGNAL SYNTHESIS APPARATUS, SIGNAL SYNTHESIS METHOD, SIGNAL TRANSMISSION SYSTEM, AND SIGNAL TRANSMISSION METHOD

(71) Applicant: SONY CORPORATION, Tokyo (JP)

(72) Inventors: Toshihisa Hyakudai, Kanagawa (JP); Toshiyuki Miyauchi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/777,714

(22) PCT Filed: Sep. 12, 2016

(86) PCT No.: PCT/JP2016/076869
§ 371 (c)(1),
(2) Date: May 21, 2018

(87) PCT Pub. No.: WO2017/094315
PCT Pub. Date: Jun. 8, 2017

(65) Prior Publication Data
US 2018/0351648 A1    Dec. 6, 2018

(30) Foreign Application Priority Data

Dec. 4, 2015   (JP) ................. 2015-237246

(51) Int. Cl.
*H04B 10/516*   (2013.01)
*H04B 10/50*    (2013.01)
(Continued)

(52) U.S. Cl.
CPC ........... *H04B 10/50* (2013.01); *H04B 1/0483* (2013.01); *H04B 10/079* (2013.01); *H04B 10/516* (2013.01); *H04L 69/14* (2013.01)

(58) Field of Classification Search
CPC .................................................. H04B 10/516
See application file for complete search history.

(56) References Cited

U.S. PATENT DOCUMENTS 6,901,082 B1 *  5/2005  Purse .................... H04J 3/1611
370/535
2010/0254704 A1   10/2010  Aoki
(Continued)

FOREIGN PATENT DOCUMENTS

JP   2004-253987 A   9/2004
JP   2010-045582 A   2/2010
(Continued)

OTHER PUBLICATIONS

International Search Report and Written Opinion of PCT Application No. PCT/JP2016/076869, dated Nov. 15, 2016, 09 pages of ISRWO.

*Primary Examiner* — Nathan M Cors
(74) *Attorney, Agent, or Firm* — Chip Law Group

(57) ABSTRACT

Provided is a sending control apparatus including a transmission path determination section that determines, from a plurality of transmission paths connected to different sending sections, respectively, one or more sending transmission paths that transmits one or a plurality of transmission object signals, respectively, obtained from sending data, on a basis of the number of sending transmission paths and prescribed information and a sending control section that controls the sending section connected to the sending transmission path so that the transmission object signal is sent via the sending transmission path.

14 Claims, 11 Drawing Sheets

(51) Int. Cl.
  *H04B 10/079* (2013.01)
  *H04L 29/06* (2006.01)
  *H04B 1/04* (2006.01)

(56) References Cited

U.S. PATENT DOCUMENTS

| | | | |
|---|---|---|---|
| 2011/0249684 A1 | 10/2011 | Nagai et al. | |
| 2013/0121688 A1 | 5/2013 | Sato | |
| 2014/0186026 A1* | 7/2014 | Oshima | H04B 10/116 398/25 |
| 2016/0226594 A1* | 8/2016 | Haas | H04B 10/516 |

FOREIGN PATENT DOCUMENTS

| | | |
|---|---|---|
| JP | 2010-263610 A | 11/2010 |
| JP | 2011-199361 A | 10/2011 |
| JP | 2011-223386 A | 11/2011 |
| JP | 2012-010014 A | 1/2012 |
| JP | 2013-106211 A | 5/2013 |
| JP | 2015-018981 A | 1/2015 |

* cited by examiner

SENDING CONTROL APPARATUS, SENDING CONTROL METHOD, SIGNAL SYNTHESIS APPARATUS, SIGNAL SYNTHESIS METHOD, SIGNAL TRANSMISSION SYSTEM, AND SIGNAL TRANSMISSION METHOD

CROSS REFERENCE TO RELATED APPLICATIONS

This application is a U.S. National Phase of International Patent Application No. PCT/JP2016/076869 filed on Sep. 12, 2016, which claims priority benefit of Japanese Patent Application No. JP 2015-237246 filed in the Japan Patent Office on Dec. 4, 2015. Each of the above-referenced applications is hereby incorporated herein by reference in its entirety.

TECHNICAL FIELD

The present disclosure relates to a sending control apparatus, a sending control method, a signal synthesis apparatus, a signal synthesis method, a signal transmission system, and a signal transmission method.

BACKGROUND ART

A signal oscillator used for a sender generally tends to experience more deterioration over time as the cumulative time taken for data sending becomes longer; and finally becomes unable to send out a signal with a desired intensity, and reaches its life span. Thus, in order to suppress such deterioration over time, it is disclosed that the operating currents of a plurality of signal oscillators are monitored and the running of the plurality of signal oscillators is leveled on the basis of the monitoring result, and thereby deterioration over time due to a specific signal oscillator being intensively used is suppressed (for example, see Patent Literature 1).

CITATION LIST

Patent Literature

Patent Literature 1: JP 2015-18981A

DISCLOSURE OF INVENTION

Technical Problem

However, it is not necessarily the case that a plurality of signal oscillators always operate. For example, also a case where the number of transmission paths used changes in dependence on information to be transmitted is envisaged. Thus, it is desired to provide a technology capable of suppressing deterioration over time due to a specific signal oscillator being intensively used, even in a case where the number of transmission paths used changes.

Solution to Problem

According to the present disclosure, there is provided a sending control apparatus including: a transmission path determination section configured to determine, from a plurality of transmission paths connected to different sending sections, respectively, one or more sending transmission paths configured to transmit one or a plurality of transmission object signals, respectively, obtained from sending data, on a basis of the number of sending transmission paths and prescribed information; and a sending control section configured to control the sending section connected to the sending transmission path so that the transmission object signal is sent via the sending transmission path.

According to the present disclosure, there is provided a sending control method including: determining, from a plurality of transmission paths connected to different sending sections, respectively, one or more sending transmission paths configured to transmit one or a plurality of transmission object signals, respectively, obtained from sending data, on a basis of the number of sending transmission paths and prescribed information; and controlling the sending section connected to the sending transmission path so that the transmission object signal is sent via the sending transmission path.

According to the present disclosure, there is provided a signal synthesis apparatus including: a signal acquisition section configured to acquire one or a plurality of transmission object signals that are obtained from sending data and are sent via one or more sending transmission paths each of which is configured to transmit the transmission object signal and is determined from a plurality of transmission paths connected to different sending sections, respectively, on a basis of the number of sending transmission paths and prescribed information if the one or plurality of transmission object signals are received; and a synthesis section configured to restore the sending data on a basis of the one or plurality of transmission object signals.

According to the present disclosure, there is provided a signal synthesis method including: acquiring one or a plurality of transmission object signals that are obtained from sending data and are sent via one or more sending transmission paths each of which is configured to transmit the transmission object signal and is determined from a plurality of transmission paths connected to different sending sections, respectively, on a basis of the number of sending transmission paths and prescribed information if the one or plurality of transmission object signals are received; and restoring the sending data by synthesizing the one or plurality of transmission object signals.

According to the present disclosure, there is provided a signal transmission system including: a sending control apparatus including a transmission path determination section configured to determine, from a plurality of transmission paths connected to different sending sections, respectively, one or more sending transmission paths configured to transmit one or a plurality of transmission object signals, respectively, obtained from sending data, on a basis of the number of sending transmission paths and prescribed information, and a sending control section configured to control the sending section connected to the sending transmission path so that the transmission object signal is sent via the sending transmission path; and a signal synthesis apparatus including a signal acquisition section configured to acquire the one or plurality of transmission object signals if the one or plurality of transmission object signals are received, and a synthesis section configured to restore the sending data by synthesizing the one or plurality of transmission object signals.

According to the present disclosure, there is provided a signal transmission method including: determining, from a plurality of transmission paths connected to different sending sections, respectively, one or more sending transmission paths configured to transmit one or a plurality of transmission object signals, respectively, obtained from sending data, on a basis of the number of sending transmission paths and prescribed information; controlling the sending section connected to the sending transmission path so that the transmission object signal is sent via the sending transmission path; acquiring the one or plurality of transmission object signals if the one or plurality of transmission object signals are received; and restoring the sending data by synthesizing the one or plurality of transmission object signals.

Advantageous Effects of Invention

As described above, according to the present disclosure, a technology capable of suppressing deterioration over time due to a specific signal oscillator being intensively used, even in a case where the number of transmission paths used changes is provided. Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
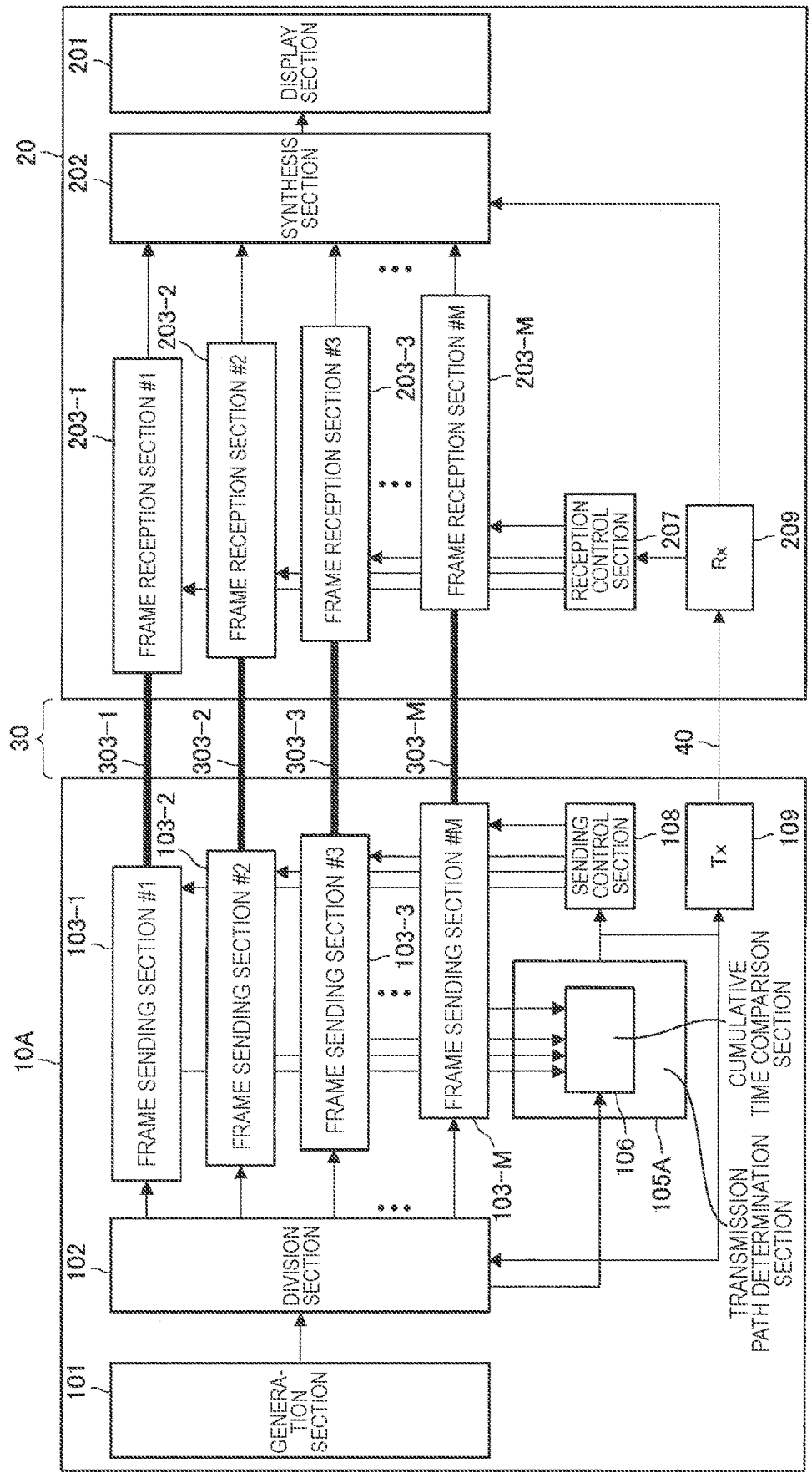
FIG. 1 is a diagram showing an example of a configuration of an image transmission system according to a first embodiment.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, in the present specification and the drawings, a plurality of components having substantially the same functional configuration are distinguished by marking different numerals after the same reference character. However, in a case where it is not necessary to particularly distinguish each of a plurality of components having substantially the same functional configuration and the like, they are marked with only the same reference character. Further, like components of different embodiments are distinguished by marking different alphabet letters after the same reference character.

Note that the description is given in the following order.
0. Background
1. First Embodiment
1.1. Configuration of sender
1.2. Configuration of receiver
2. Second Embodiment
2.1. Configuration of sender
3. Conclusions 0. Background First, the background of the present embodiment is described. These days, cases where an ultra-high definition video signal (for example, a 4K video signal, etc.) exceeding a 2K video signal, which has been widespread up to now, is transmitted between devices and cases where a high definition video signal is displayed on a device are becoming more common. Further, it is expected that also cases where an ultra-high definition video signal (for example, an 8K video signal) is transmitted between devices and cases where an ultra-high definition video signal is displayed on a device will become more common. Such an ultra-high definition video signal has a feature of its transmission band being very wide.

For example, in a case of a common 4K video signal (for example, the number of effective pixels being 3840×2160, the color format being RGB, the depth being 12 bits, and the frame rate being 60 Hz) of Consumer Electronics Association (CEA), the total transmission band is approximately 21 Gbps. On the other hand, in a case of an 8K video signal (for example, the number of effective pixels being 7680×4320, the color format being RGB, the depth being 12 bits, and the frame rate being 120 Hz), which is expected to be widespread in the future, the total transmission band is approximately 171 Gbps.

On the other hand, to transmit such a wide-band ultra-high definition video signal, a device capable of transmitting a wide-band signal is needed. For example, there is a standard of Interface for UHDTV Production Systems (ARIB STD-B58) standardized by Association of Radio Industries and Businesses (ARIB). This standard prescribes that an 8K video signal be transmitted using, as a transmission path, each of 24 optical fibers each having a transmission capacity of 10.692 Gpbs. It is expected that a device that transmits an ultra-high definition video signal for general use will be developed in the future; also in this event, it is expected that a device that performs transmission using a plurality of optical fibers, as prescribed in STD-B58, will be developed.

In general, in a case where transmission using an optical fiber is performed, the sender obtains a transmission object signal by modulating laser light emitted by a semiconductor laser oscillator on the basis of the information to be transmitted (sending data), and transmits the transmission object signal to the receiver via an optical fiber. On the other hand, the receiver receives the transmission object signal by receiving laser light with a photodetector, and extracts the information to be transmitted by demodulating the transmission object signal. Transmission using an optical fiber is performed by such a procedure.

Here, the semiconductor laser oscillator used for the sender generally tends to experience more deterioration over time as the cumulative light emission time becomes longer; and finally becomes unable to emit light with a desired amount of light, and reaches its life span. Thus, in order to suppress such deterioration over time, it is disclosed that the operating currents of a plurality of laser oscillators are monitored and the running of the plurality of laser oscillators is leveled on the basis of the monitoring result, and thereby deterioration over time of a specific semiconductor laser oscillator is suppressed (for example, see JP 2015-18981A).

However, it is not necessarily the case that a plurality of semiconductor laser oscillators always operate. For example, also a case where the number of transmission paths used changes in dependence on information to be transmitted is envisaged. Thus, the present specification mainly proposes a technology capable of suppressing deterioration over time due to a specific semiconductor laser oscillator being intensively used, even in a case where the number of transmission paths used changes. Note that, although the present specification mainly describes an example in which a video signal is handled as sending data, also an audio signal and other types of signals can be handled as sending data similarly to a video signal. Further, as described later, the sending data may not be an optical signal but be other signals, such as an electrical signal.

Hereinabove, the background of the present embodiment is described.

1. First Embodiment

Next, a configurational example of an image transmission system according to a first embodiment is described with reference to FIG. 1. FIG. 1 is a diagram showing an example of the configuration of an image transmission system according to the first embodiment. As shown in FIG. 1, an image transmission system 1A includes a sender 10A and a receiver 20. Further, the sender 10A and the receiver 20 are connected together via a cable 30. Although the first embodiment describes an example in which the cable 30 includes transmission paths 303-1 to 303-M (M being an integer of more than or equal to 2), the number of transmission paths 303 is not particularly limited as long as it is plural. Note that the sender 10A can function as a "sending control apparatus." Further, the receiver 20 can function as a "signal synthesis apparatus."

(1-1. Configuration of Sender)

Next, the configuration of the sender 10A is described. As shown in FIG. 1, the sender 10A includes a generation section 101, a division section 102, frame sending sections 103-1 to 103-M, a transmission path determination section 105A, a sending control section 108, and an information sending section 109. Further, the transmission path determination section 105A includes a cumulative time comparison section 106. Note that a detailed configuration of the frame sending sections 103-1 to 103-M is described later with reference to FIG. 2.

The generation section 101 generates data to be sent to the receiver 20 (hereinafter, occasionally referred to as "sending data"). For example, the generation section 101 determines sending data on the basis of a prescribed start manipulation by the user, and generates the determined sending data. Here, the type of the sending data is not particularly limited. For example, the sending data may include a video signal, and the sending data may include audio data and may include other types of data. Note that, although in the example shown in FIG. 1 the generation section 101 is incorporated in the sender 10A, the generation section 101 may exist outside the sender 10A, and may be connected to the sender 10A via wire or wirelessly.

The division section 102 calculates the number of transmission paths to be used for the transmission of sending data (hereinafter, occasionally referred to as "sending transmission paths"), on the basis of the transmission rate of the sending data and the transmission capacity per one of the transmission paths 303-1 to 303-M. More specifically, the division section 102 divides the transmission rate of the sending data by the transmission capacity per one of the transmission paths 303-1 to 303-M, and thus obtains the division result. Then, the division section 102 calculates an integer that the division result does not exceed (for example, the smallest integer) as the number of sending transmission paths. The calculation of the number of sending transmission paths may be performed in a case where sending data are determined, or may be performed at intervals of a prescribed period of time.

Further, the division section 102 obtains one or a plurality of transmission object signals from the sending data on the basis of the number of sending transmission paths. For example, in a case where the number of sending transmission paths is one, the division section 102 obtains the sending data as they are, as a transmission object signal. On the other hand, in a case where the number of sending transmission paths is plural, the division section 102 obtains a plurality of transmission object signals by dividing the sending data into an equal number of data to the number of sending transmission paths. In this event, how the sending data are divided by the division section 102 is not particularly limited.

The transmission path determination section 105A determines one or more sending transmission paths from the transmission paths 303-1 to 303-M on the basis of the number of sending transmission paths and prescribed information. The timing at which the sending transmission path is determined by the transmission path determination section 105A is not particularly limited. The first embodiment mainly envisages a case where the transmission path determination section 105A determines the sending transmission path from the transmission paths 303-1 to 303-M in a case where sending data are determined on the basis of the start manipulation by the user. However, the transmission path determination section 105A may also determine the sending transmission path from the transmission paths 303-1 to 303-M in a case where the number of sending transmission paths has changed.

The technique for determining the sending transmission path is not particularly limited, either. As mentioned above, in general the signal oscillator becomes more likely to experience deterioration over time as the cumulative time taken for data sending becomes longer. Thus, in the first embodiment, the transmission path determination section 105A determines the sending transmission path from the transmission paths 303-1 to 303-M on the basis of the number of sending transmission paths and the cumulative time it has taken for a laser diode (LD) 1036 (see FIG. 2) connected to each of the transmission paths 303-1 to 303-M to perform data sending.

More specifically, the cumulative time comparison section 106 may select, from the transmission paths 303-1 to 303-M, one or a plurality of transmission paths equal to the number of sending transmission paths in ascending order of the cumulative time taken for the data sending of the LD 1036, and the transmission path determination section 105A may determine the selected one or plurality of transmission paths as one or a plurality of sending transmission paths. In a case where there are LDs 1036 with the same cumulative time taken for data sending, the transmission path determination section 105A may determine them as the sending transmission path in accordance with a prescribed rule (for example, preferentially a transmission path of which the assigned identification information is smaller).

Further, the management of the cumulative time taken for the data sending of the LD 1036 may be performed in any manner. For example, the management of the cumulative time taken for the data sending of the LD 1036 is performed by a cumulative time counter 1037 (see FIG. 2) and a memory 1041 (see FIG. 2) existing for each LD 1036 (see FIG. 2). The memory 1041 stores the cumulative time for each LD 1036. Further, the cumulative time counter 1037 measures the cumulative time taken for data sending for each LD 1036, and records the cumulative time on the memory 1041 for each LD 1036.

Figure 2:
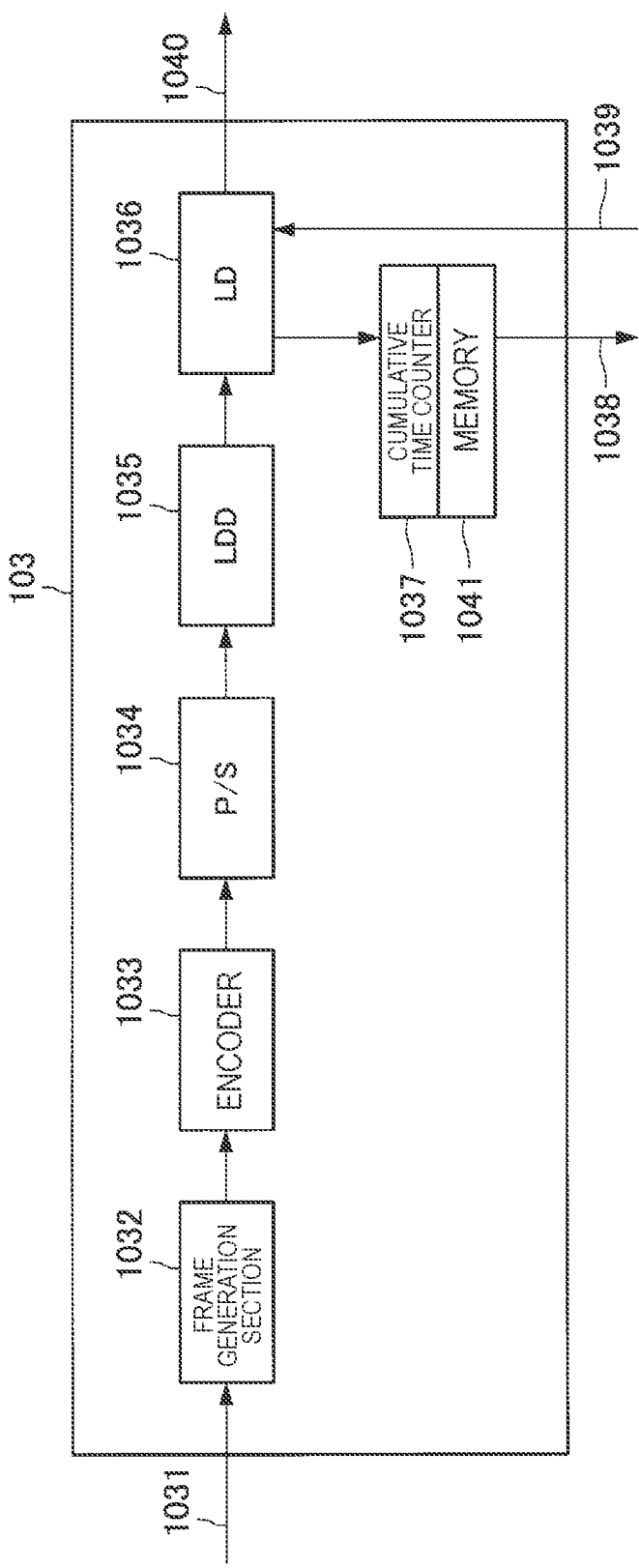
FIG. 2 is a diagram showing an example of a detailed configuration of a frame sending section.

The cumulative time stored by the memory 1041 is inputted to the cumulative time comparison section 106 via an output terminal 1038 (see FIG. 2). Note that the timing of starting the counting of the cumulative time is preferably the time when the sender 10 is manufactured, but is not particularly limited. Further, it is preferable that the cumulative time not be erased from the memory 1041 even if the power source of the sender 10 is turned off; thus, the memory 1041 is preferably a nonvolatile memory.

The division section 102 outputs the one or plurality of transmission object signals obtained in the above manner to lanes leading to different sending transmission paths, respectively. For example, in a case where two transmission object signals are obtained from sending data by the division section 102 and the transmission path 303-1 and the transmission path 303-2 are determined as sending transmission paths by the transmission path determination section 105A, the division section 102 may output the first transmission object signal to a lane leading to the transmission path 303-1, and may output the second transmission object signal to a lane leading to the transmission path 303-2.

Each of the frame sending sections 103-1 to 103-M accepts the input of a transmission object signal if it exists on the lane to which the transmission object signal is outputted by the division section 102. For example, in a case where the first transmission object signal is outputted from the division section 102 to the lane leading to the transmission path 303-1, the transmission object signal is inputted to the frame sending section 103-1. Further, for example, in a case where the second transmission object signal is outputted from the division section 102 to the lane leading to the transmission path 303-2, the transmission object signal is inputted to the frame sending section 103-2.

FIG. 2 is a diagram showing an example of a detailed configuration of the frame sending section 103. As shown in FIG. 2, the frame sending section 103 includes a frame generation section 1032, an encoder 1033, a parallel/serial conversion section (P/S) 1034, a laser diode driver (LDD) 1035, the LD 1036, the cumulative time counter 1037, and the memory 1041. The function of each of the cumulative time counter 1037 and the memory 1041 is as described above. Herein, the function of each of the frame generation section 1032, the encoder 1033, the P/S 1034, the LDD 1035, and the LD 1036 is described.

Figure 3:
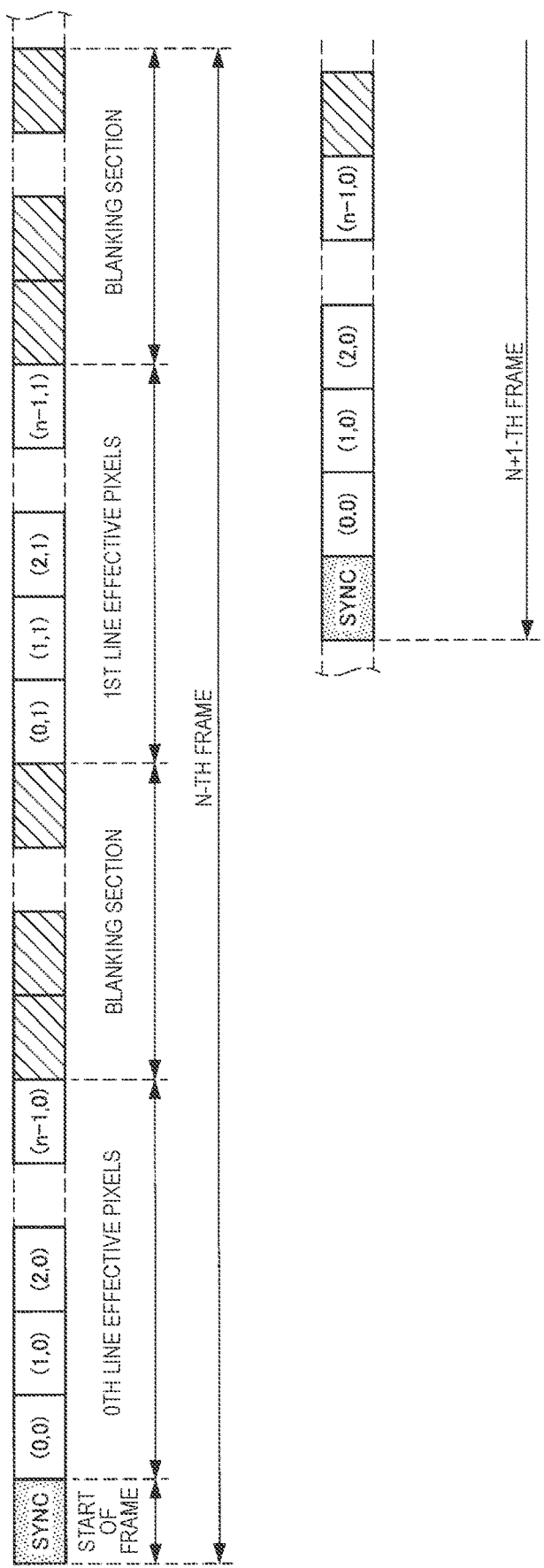
FIG. 3 is a diagram showing a configurational example of a frame generated by a frame generation section.

If a transmission object signal is inputted from an input terminal 1031, the frame generation section 1032 generates a frame including the transmission object signal. FIG. 3 is a diagram showing a configurational example of the frame generated by the frame generation section 1032. In FIG. 3, the whole of the N-th frame is shown as the N-th (N being an integer of more than or equal to 0) frame, and a part of the N+1-th frame is shown as the N+1-th frame. The frame generation section 1032 generates a frame that includes, in order, the front-end line of the transmission object signal (the 0th line in the sending data), the second line of the transmission object signal (the 1st line in the sending data), and the lines following the above lines.

As shown in FIG. 3, the frame generation section 1032 marks a frame start identifier (SYNC) on the head of the frame. Any one of prescribed codes at least not existing in the video signal (hereinafter, occasionally referred to as "special data") is assigned to the frame start identifier. For example, the special data depend on the encoding of data transmitted and received through the transmission path 303 leading to the relevant lane. For example, in a case where ANSI 8b/10b conversion is used for the encoding of data transmitted and received through the transmission path 303, a K code may be assigned to the special data. For example, data in which a K code called K28.5 (0xBC) appears consecutively N bytes may be assigned to the frame start identifier.

The encoder 1033 performs encoding on the frame. Specifically, the encoder 1033 performs 8b/10b encoding on the frame. In this event, the encoder 1033 may substitute the frame start identifier of the frame with corresponding special data, and substitute data other than the frame start identifier with 10-bit-based data. Further, the P/S 1034 converts the encoded frame from parallel data to serial data in order to change the frame to a form suitable for high-speed transmission. The LDD 1035 drives the LD 1036.

The LD 1036 outputs the frame outputted from the LDD 1035, from an output terminal 1040, and thereby sends the frame to the receiver 20 via the transmission path 303. Note that, although the present embodiment envisages a case where the transmission path 303 includes an optical fiber and the LD 1035 converts the frame to an optical signal and then sends the optical signal to the receiver 20, the type of the signal sent from the sender 10A to the receiver 20 is not limited. For example, the sender 10A may send the frame to the receiver 20 by means of an electrical signal. Therefore, not only the LD 1036 but also a "sending section" that sends a transmission object signal may be used.

Further, the sending control section 108 starts up the cumulative time counter 1037. The cumulative time counter 1037 started up by the sending control section 108 starts, in conjunction with frame output by the LD 1036, an operation of counting up the cumulative time of the LD 1036 connected to the sending transmission path in accordance with the lapse of time.

The sending control section 108 controls the LD 1036 connected to the sending transmission path determined by the transmission path determination section 105A so that the transmission object signal is sent via the sending transmission path. For example, in a case where the transmission path 303-1 and the transmission path 303-2 are determined as sending transmission paths by the transmission path determination section 105A, the sending control section 108 controls the LD 1036 leading to the transmission path 303-1 so that the first transmission object signal is sent by this LD 1036, and controls the LD 1036 leading to the transmission path 303-2 so that the second transmission object signal is sent by this LD 1036.

Further, the sending control section 108 may start up the LD 1036 connected to the sending transmission path determined by the transmission path determination section 105A among the transmission paths 303-1 to 303-M, and may allow the LD 1036 connected to a transmission path 303 different from the sending transmission path to remain stopped. Thereby, the sending operation by the LD 1036 not to be used for the sending of the frame is stopped; thus, it becomes possible to reduce the power consumption of the sender 10A. In this event, the cumulative time counter 1037 starts, in conjunction with frame output by the LD 1036, an operation of counting up the cumulative time in association with the lapse of time.

After that, a case where the sending of the last frame is ended or a case where sending data of which the sending is to be ended on the basis of a prescribed end manipulation by the user are determined is envisaged. In such a case, the sending control section 108 causes the LD 1036 connected to the sending transmission path to stop, and the cumulative time counter 1037 ends the operation of counting up the cumulative time of the LD 1036 connected to the sending transmission path in accordance with the lapse of time and records this cumulative time on the memory 1041. The cumulative time counter 1037 is stopped by the sending control section 108.

The information sending section 109 sends the identification information of the sending transmission path determined by the transmission path determination section 105A to the receiver 20 via a transmission path 40. The sending of the identification information may be performed in a case where the sending transmission path is determined. Note that, although the first embodiment envisages a case where the transmission path 40 includes an optical fiber and the information sending section 109 converts the frame to an optical signal and then sends the optical signal to the receiver 20, the type of the identification information is not limited. For example, the information sending section 109 may send the identification information to the receiver 20 by means of an electrical signal.

(1-2. Configuration of Receiver)

Next, the configuration of the receiver 20 is described. The receiver 20 includes a display section 201, a synthesis section 202, a frame reception section 203, a reception control section 207, and an information reception section 209. The information reception section 209 receives the light of the identification information of a sending transmission path that is sent by an optical signal from the sender 10, and converts the light to an electrical signal. Note that, although the first embodiment envisages a case where the information reception section 209 includes an optical fiber and the information reception section 209 receives the light of the frame and converts the light to an electrical signal, the type of the identification information is not limited, as mentioned above. For example, the information reception section 209 may receive the identification information of the sending transmission path from the sender 10 by means of an electrical signal.

Figure 4:
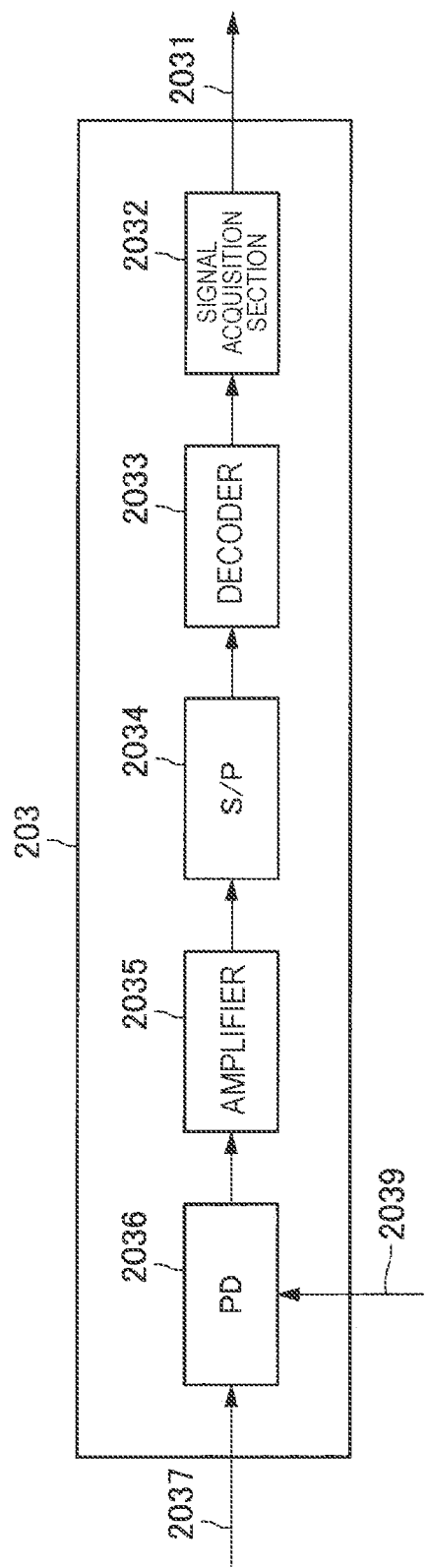
FIG. 4 is a diagram showing an example of a detailed configuration of a frame reception section.

FIG. 4 is a diagram showing an example of a detailed configuration of the frame reception section 203. As shown in FIG. 4, the receiver 20 includes a photodetector (PD) 2036, an amplifier 2035, a serial/parallel conversion section (S/P) 1034, a decoder 2033, and a signal acquisition section 2032. The PD 2036 receives a frame sent from the sender 10, via an input terminal 2037.

The PD 2036 receives the light of the frame that is sent by an optical signal from the sender 10A, and converts the light to an electrical signal. Note that, although the first embodiment envisages a case where the transmission path 303 includes an optical fiber and the PD 2036 receives the light of the frame and converts the light to an electrical signal, the type of the signal sent from the sender 10A to the receiver 20 is not limited, as mentioned above. For example, the receiver 20 may receive the frame from the sender 10A by means of an electrical signal.

The reception control section 207 preferably causes the reception operation by the PD 2036 connected to, among the transmission paths 303-1 to 303-M, a sending transmission path identified by the identification information received by the information reception section 209 to stop, via an input terminal 2039. For example, in a case where the identification information of the transmission path 303-1 and the identification information of the transmission path 303-2 are received as the identification information of the sending transmission path by the information reception section 209, the reception control section 207 preferably causes the reception operation by the LDs 303-1 to 303-2 to stop. Thereby, the sending operation by the PD 2036 not to be used for the reception of the frame is stopped; thus, it becomes possible to reduce the power consumption of the sender 10A.

The amplifier 2035 amplifies a frame as an electrical signal outputted from the PD 2036, and outputs the amplified frame to the S/P 2034. For example, the amplifier 2035 may obtain a voltage signal by performing impedance conversion on a current signal, and then perform amplitude amplification on the voltage signal. The S/P 2034 converts the form of the frame from serial data to parallel data.

The decoder 2033 decodes the frame converted to parallel data. Specifically, the decoder 2033 may perform 8b/10b decoding on the frame. For example, the decoder 2033 may substitute special data of 10 bits corresponding to the frame start identifier of this frame with the frame start identifier. On the other hand, the decoder 2033 may substitute also the remaining data of the frame with 8-bit data.

The signal acquisition section 2032 acquires a transmission object signal from the inputted frame, and outputs the acquired transmission object signal to the synthesis section 202 via an output terminal 2031. More specifically, since the frame start identifier substituted from a special code is marked on the head of the frame, the signal acquisition section 2032 detects the frame start identifier and detects the position of the frame start identifier as the position of the head of the frame. The signal acquisition section 2032 acquires the transmission object signal on the basis of the detected position of the frame start identifier.

The synthesis section 202 restores the sending data on the basis of the transmission object signal inputted from the sending transmission path that is identified by each of one or a plurality of pieces of identification information received by the information reception section 209. For example, in a case where a transmission object signal is inputted from the frame reception section 203-1 and a transmission object signal is not inputted from the frame reception sections 203-2 to 203-M, the synthesis section 202 takes, as the sending data, one transmission object signal inputted from the frame reception section 203-1 as it is. Further, in a case where a transmission object signal is inputted from each of the frame reception section 203-1 and the frame reception section 203-2, the synthesis section 202 restores the sending data by synthesizing these transmission object signals.

The display section 201 reproduces the inputted sending data, and displays the reproduced sending data. The display section 201 may be, for example, display devices such as a liquid crystal display (LCD), a plasma display panel (PDP), an organic electro-luminescence (EL) display, and a projector, a display device of holograms, or the like. Further, in a case where the sending data include audio data, the display section 201 may include audio output devices such as a loudspeaker and a headphone, or the like.

Hereinbelow, a description is given using specific examples. Herein, it is assumed that the number of transmission paths 301 is five. Further, if the transmission rate yielded by each of the sender 10A and the receiver 20 is set to 12.5 Gbps and 8b/10b encoding is performed on the frame, the transmission rate of the video signal yielded by each of the sender 10A and the receiver 20 is 10 Gbps. It is envisaged that a video signal G1 (FIG. 5) and a video signal G2 (FIG. 6) are sent from the sender 10A to the receiver 20.

Figure 5:
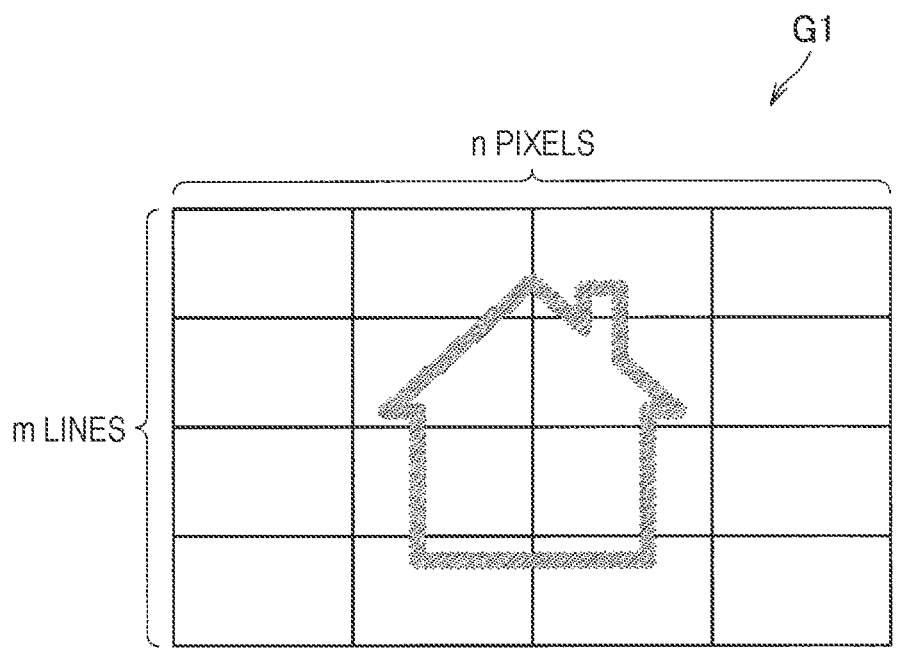
FIG. 5 is a diagram showing an example of a first video signal.

FIG. 5 is a diagram showing an example of a first video signal G1. Referring to FIG. 5, the number of pixels in the horizontal direction of the video signal G1 is n, and the number of lines in the vertical direction of the video signal G1 is m. If it is assumed that the transmission rate of the video signal G1 is 10 Gbps, the video signal G1 can be sent by one transmission path 301.

Figure 6:
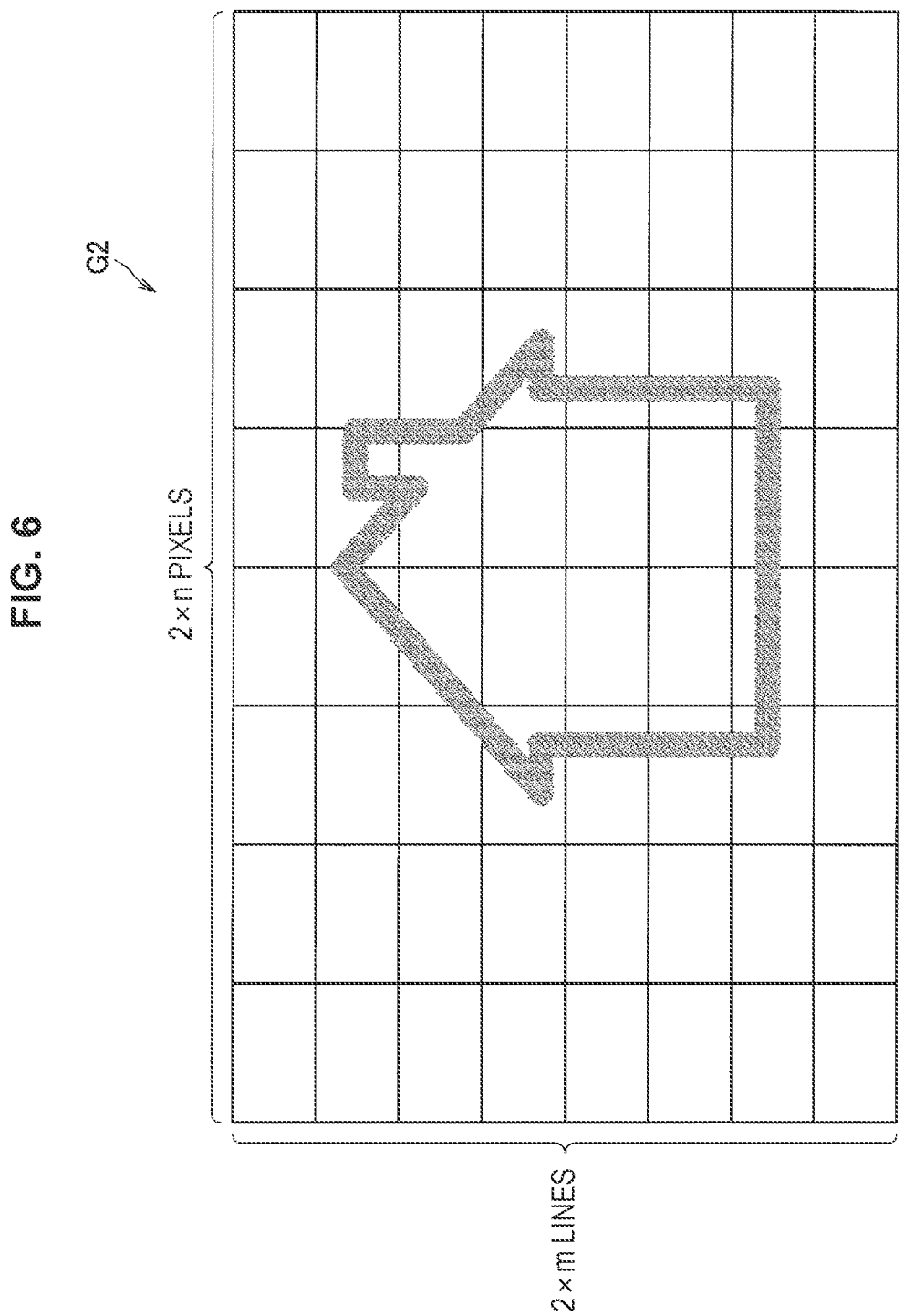
FIG. 6 is a diagram showing an example of a second video signal.
Figure 7:
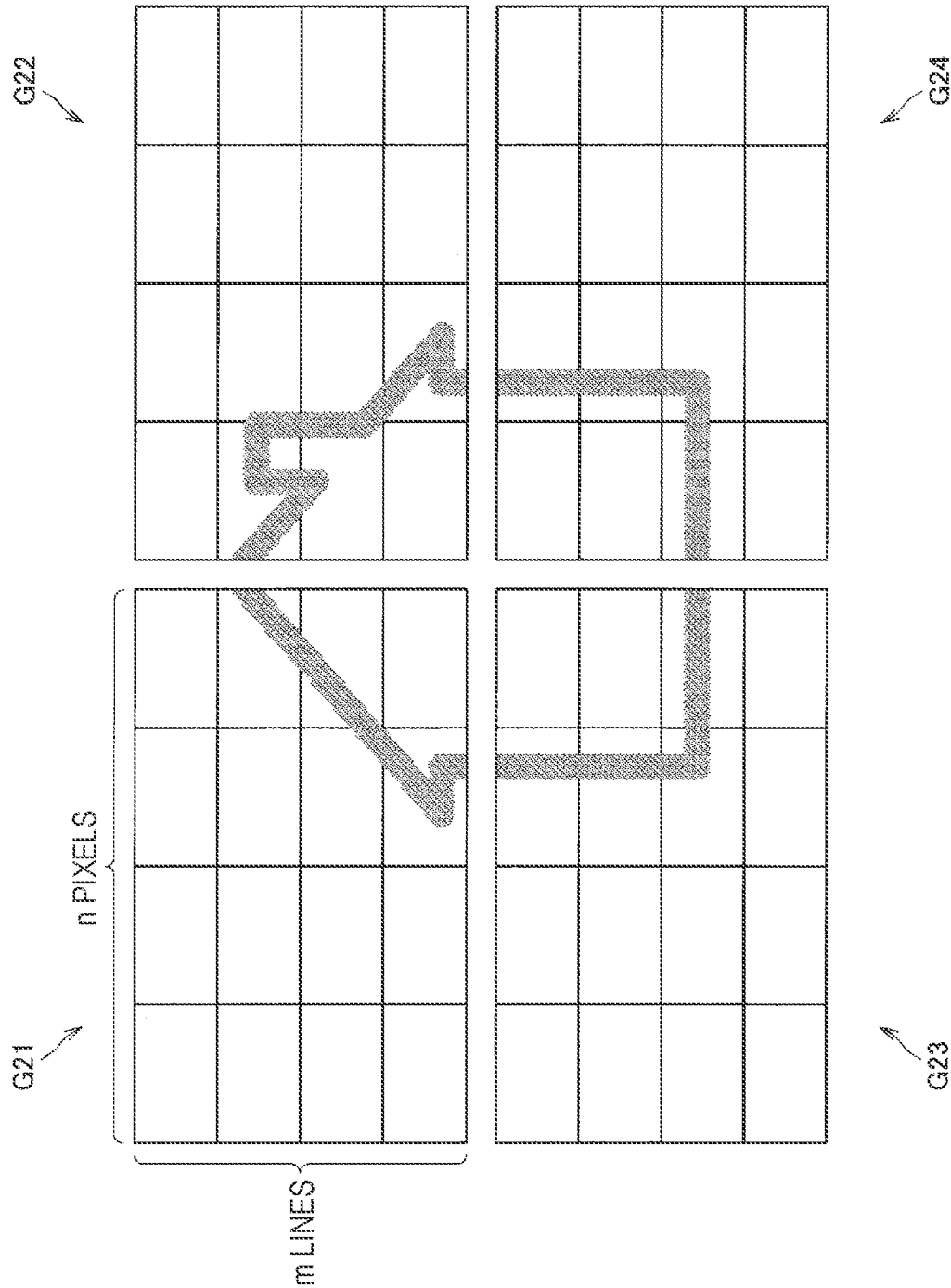
FIG. 7 is a diagram showing an example of transmission object signals obtained by a video signal being divided into four signals.

FIG. 6 is a diagram showing an example of a second video signal G2. FIG. 7 is a diagram showing an example of divided signals G21 to G24 obtained by the video signal G2 being divided into four signals. Referring to FIG. 6, the number of pixels in the horizontal direction of the video signal G2 is 2×n, and the number of lines in the vertical direction of the video signal G2 is 2×m. If it is assumed that the transmission rate of the video signal G2 is 40 Gbps, the divided signals G21 to G24 divided from the video signal G2 can be sent by four transmission paths, respectively, among the five transmission paths 301.

Figure 8:
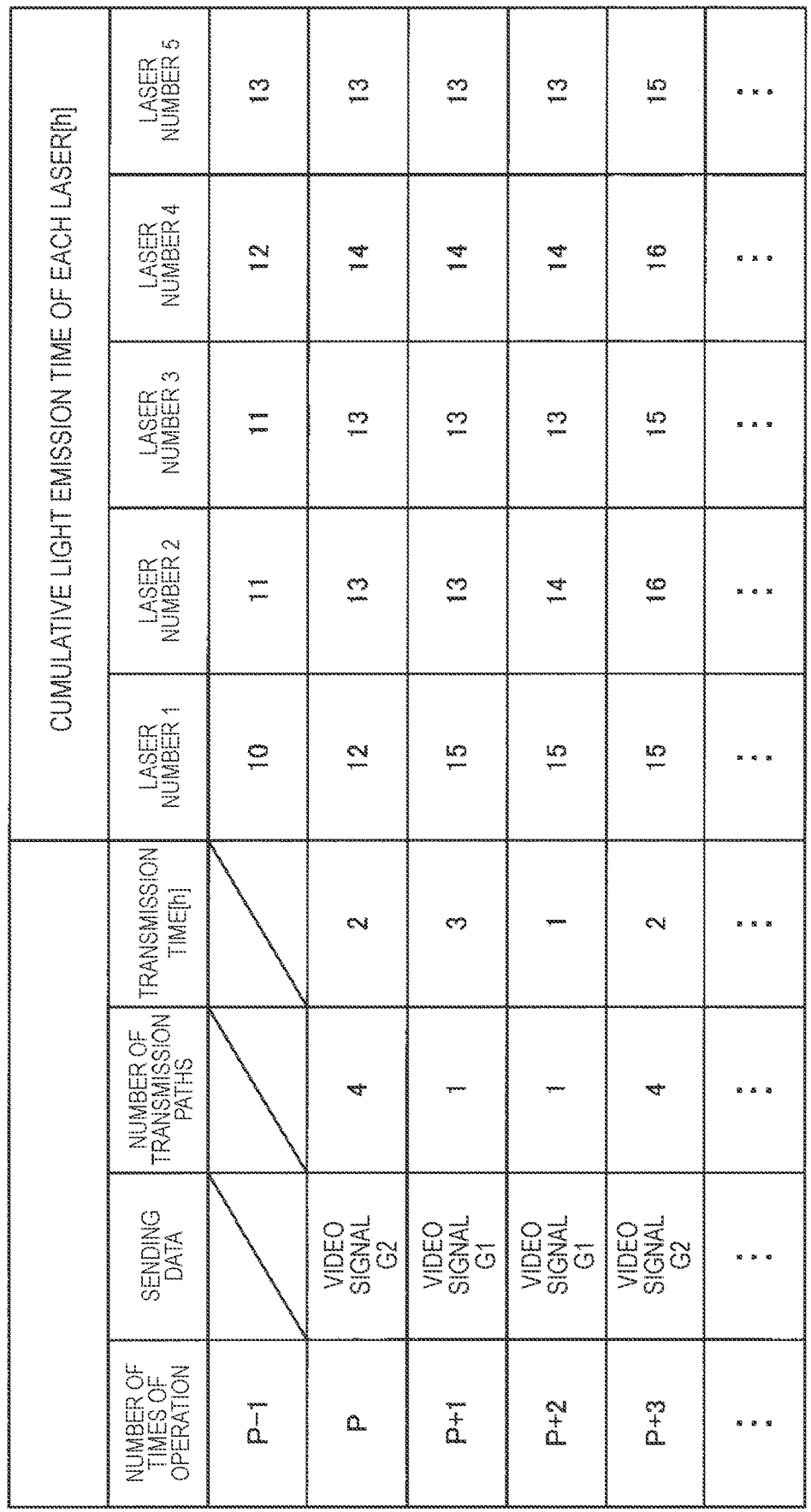
FIG. 8 is a diagram showing an example of change in a cumulative light emission time for each laser (LD).

FIG. 8 is a diagram showing an example of change in the cumulative light emission time for each laser (LD). Referring to FIG. 8, the number of times of operation, the sending data, the number of transmission paths, the transmission time, and the cumulative light emission time for each laser are correlated to each other. Herein, it is assumed that five lasers (LDs) are used. Further, as shown in FIG. 8, it is assumed that the five lasers (LDs) are marked with laser numbers 1 to 5, respectively, as the identification information of the transmission path.

First, the sending data determined in the operation of the P-th time are the video signal G2. As mentioned above, the number of transmission paths necessary to send the video signal G2 is four. Thus, the transmission path determination section 105A selects four laser numbers 1 to 4 in ascending order of the cumulative light emission time of the operation of the (P−1)-th time.

As shown in FIG. 8, if the transmission time in the operation of the P-th time is 2 hours, the cumulative time counter 1037 adds 2 hours to the cumulative light emission time of each of laser numbers 1 to 4 in the operation of the (P−1)-th time, and thereby obtains the cumulative light emission time of each of laser numbers 1 to 4 in the operation of the P-th time. On the other hand, as shown in FIG. 8, the cumulative time counter 1037 uses the cumulative light emission time of laser number 5 in the operation of the (P−1)-th time as it is, as the cumulative light emission time of laser number 5 in the operation of the P-th time.

Next, the sending data determined in the operation of the (P+1)-th time are the video signal G1. As mentioned above, the number of transmission paths necessary to send the video signal G1 is one. Thus, the transmission path determination section 105A selects laser number 1, of which the cumulative light emission time of the operation of the P-th time is shortest.

As shown in FIG. 8, if the transmission time in the operation of the (P+1)-th time is 3 hours, the cumulative time counter 1037 adds 3 hours to the cumulative light emission time of laser number 1 in the operation of the P-th time, and thereby obtains the cumulative light emission time of laser number 1 in the operation of the (P+1)-th time. On the other hand, as shown in FIG. 8, the cumulative time counter 1037 uses the cumulative light emission time of each of laser numbers 1 to 4 in the operation of the P-th time as it is, as the cumulative light emission time of each of laser numbers 1 to 4 in the operation of the (P+1)-th time.

Next, the sending data determined in the operation of the (P+2)-th time are the video signal G1. As mentioned above, the number of transmission paths necessary to send the video signal G1 is one. Thus, the transmission path determination section 105A selects laser numbers 2, 3, and 5, of which the cumulative light emission time of the operation of the (P+1)-th time is shortest. Then, for example, the transmission path determination section 105A selects laser number 2, which is the smallest number, among laser numbers 2, 3, and 5.

As shown in FIG. 8, if the transmission time in the operation of the (P+2)-th time is 1 hour, the cumulative time counter 1037 adds 1 hour to the cumulative light emission time of laser number 2 in the operation of the (P+1)-th time, and thereby obtains the cumulative light emission time of laser number 2 in the operation of the (P+2)-th time. On the other hand, as shown in FIG. 8, the cumulative time counter 1037 uses the cumulative light emission time of each of laser numbers 1 and 3 to 5 in the operation of the (P+2)-th time as it is, as the cumulative light emission time of each of laser numbers 1 and 3 to 5 in the operation of the (P+2)-th time.

The operation described with reference to FIG. 8 is repeated, and thereby the running times in the lasers marked with laser numbers 1 to 5 are leveled. Thus, deterioration over time due to a specific laser being intensively used is suppressed by the operation described with reference to FIG. 8 being repeated.

Figure 9:
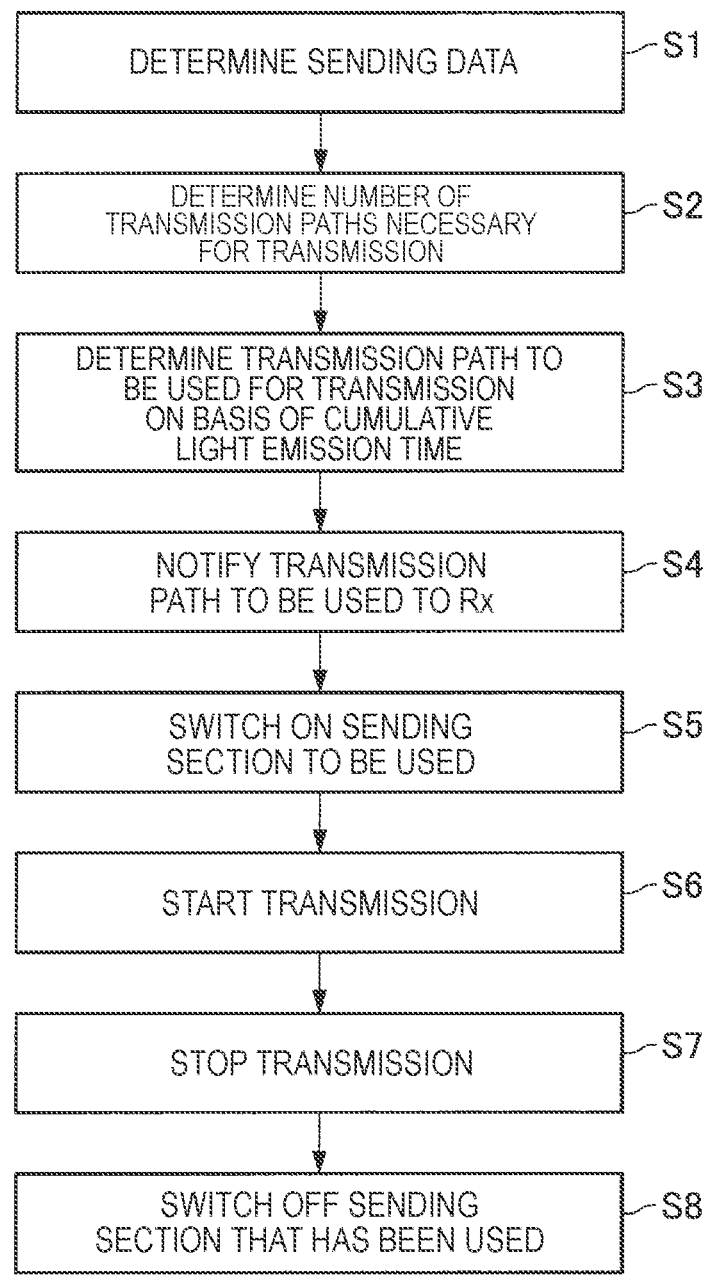
FIG. 9 is a flow chart showing an example of operation of a sender according to the first embodiment.

Next, an example of the operation of the sender 10A is described. FIG. 9 is a flow chart showing an example of the operation of the sender 10A. As shown in FIG. 9, if sending data are determined in the sender 10A (S1), the division section 102 determines the number of transmission paths necessary for the transmission of the sending data (S2). Subsequently, the transmission path determination section 105A determines the transmission path to be used for the transmission of the sending data on the basis of the cumulative light emission time of each of the LDs 1036 (S3). The information sending section 109 notifies the transmission path to be used for the transmission of the sending data to the information reception section 209 (S4).

Subsequently, the sending control section 108 switches on the sending section (the LD 1036) to be used for the transmission of the sending data (S5), and starts the transmission of the sending data by the LD 1036 (S6). In this event, the cumulative time counter 1037 is started up, and the counting-up of the cumulative light emission time of the LD 1036 is started. If the sending control section 108 stops the transmission of the sending data by the LD 1036 (S7), the sending control section 108 switches off the sending section (the LD 1036) that has been used for the transmission of the sending data (S8). Further, in conjunction with the stop of the transmission of the sending data by the LD 1036, also the cumulative time counter 1037 is stopped. Such an operation is executed repeatedly. The running times of the LDs 1036 are leveled, and deterioration over time due to a specific LD 1036 being intensively used is suppressed.

2. Second Embodiment

Figure 10:
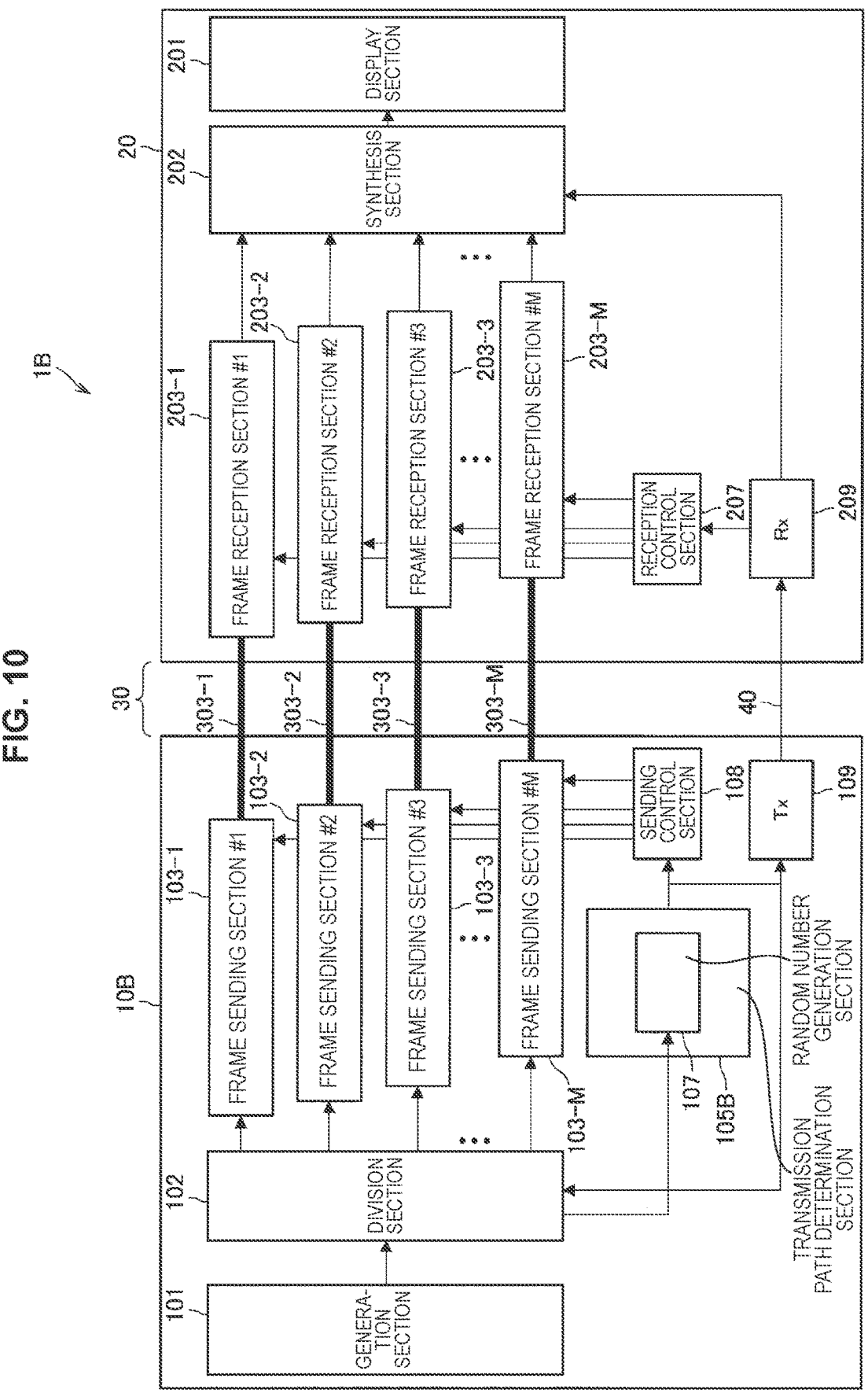
FIG. 10 is a diagram showing an example of a configuration of an image transmission system according to a second embodiment.

Next, a second embodiment is described. A configurational example of an image transmission system according to the second embodiment is described with reference to FIG. 10. FIG. 10 is a diagram showing an example of the configuration of an image transmission system according to the second embodiment. As shown in FIG. 10, an image transmission system 1B includes a sender 10B and the receiver 20. The sender 10B according to the second embodiment differs from the sender 10A according to the first embodiment in that the sender 10B includes not the transmission path determination section 105A but a transmission path determination section 105B. Note that also the sender 10B can function as a "sending control apparatus."

(2-1. Configuration of Sender)

Next, the configuration of the sender 10B is described. As shown in FIG. 10, the transmission path determination section 105B according to the second embodiment includes a random number generation section 107. The random number generation section 107 generates random numbers. For example, in a case where the transmission paths 303-1 to 303-M are marked with numbers 1 to M, the random number generation section 107 generates an equal number of random numbers between numbers 1 to M to the number of sending transmission paths. Then, the transmission path determination section 105B determines the sending transmission path from the transmission paths 303-1 to 303-M on the basis of the equal number of generated random numbers to the number of sending transmission paths.

Specifically, the transmission path determination section 105B determines, as the sending transmission path, a transmission path 303 marked with a number coinciding with each of the equal number of generated random numbers to the number of sending transmission paths. In the second embodiment, such an operation is executed repeatedly; thereby, similarly to the first embodiment, the running times of the LDs 1036 are leveled, and deterioration over time due to a specific LD 1036 being intensively used is suppressed.

Figure 11:
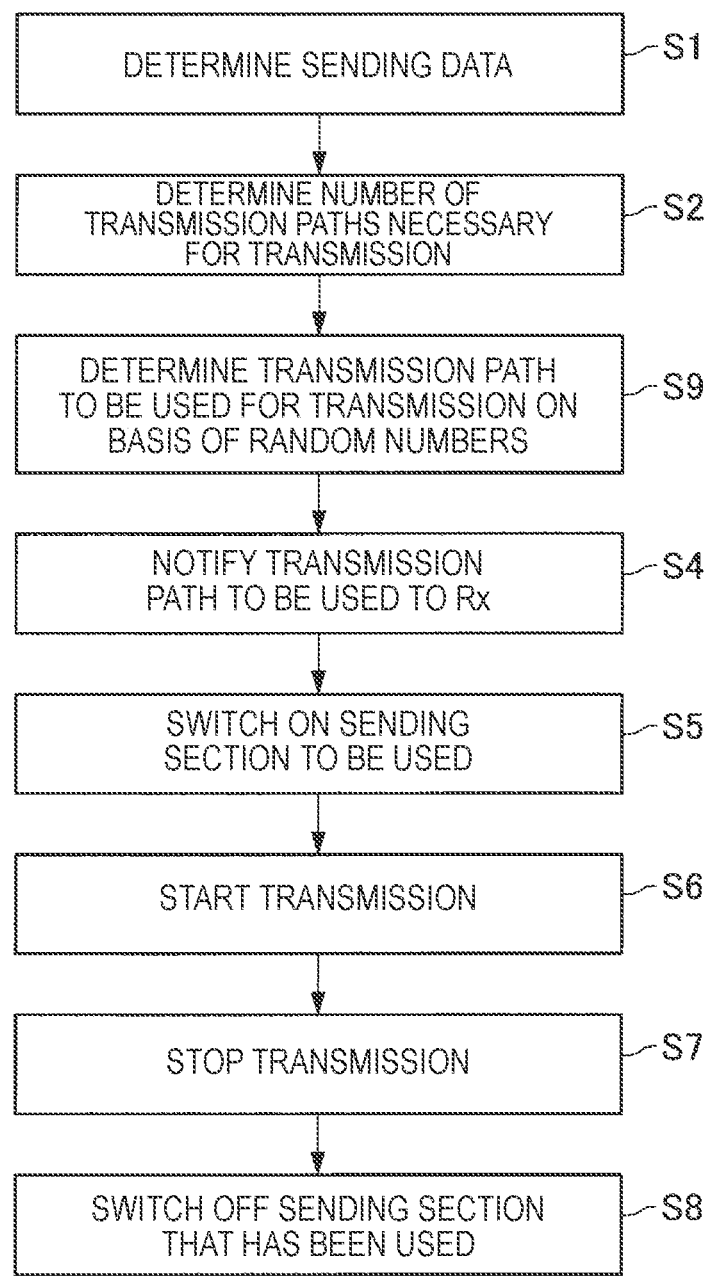
FIG. 11 is a flow chart showing an example of operation of a sender according to the second embodiment.

Next, an example of the operation of the sender 10B is described. FIG. 11 is a flow chart showing an example of the operation of the sender 10B. As shown in FIG. 10, if sending data are determined (S1), the division section 102 determines the number of transmission paths necessary for the transmission of the sending data (S2). Subsequently, the transmission path determination section 105B determines the transmission path to be used for the transmission of the sending data on the basis of an equal number of generated random numbers to the determined number of transmission paths (S9). The information sending section 109 notifies the transmission path to be used for the transmission of the sending data to the information reception section 209 (S4).

Subsequently, the sending control section 108 switches on the sending section (the LD 1036) to be used for the transmission of the sending data (S5), and starts the transmission of the sending data by the LD 1036 (S6). If the sending control section 108 stops the transmission of the sending data by the LD 1036 (S7), the sending control section 108 switches off the sending section (the LD 1036) that has been used for the transmission of the sending data (S8). Such an operation is executed repeatedly. The running times of the LDs 1036 are leveled, and deterioration over time due to a specific LD 1036 being intensively used is suppressed.

3. Conclusions

As described hereinabove, according to an embodiment of the present disclosure, the sending control apparatus 10A including the transmission path determination section 105 that determines, from a plurality of transmission paths 303-1 to 303-M connected to different LDs 1036, respectively, one or more sending transmission paths that transmit one or a plurality of transmission object signals, respectively, obtained from sending data, on the basis of the number of sending transmission paths and prescribed information, and the sending control section 108 that controls the LD 1036 connected to the sending transmission path so that the transmission object signal is sent via the sending transmission path is provided.

By such a configuration, it becomes possible to suppress deterioration over time due to a specific signal oscillator being intensively used, even in a case where the number of transmission paths used changes.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, in the above, an example in which the sending control section 108 causes the LD 1036 to start up and causes the LD 1036 to stop is described. However, the sending control section 108 may also cause the whole of the frame sending section 103 to start up and cause the whole of the frame sending section 103 to stop. Thereby, it becomes possible to further reduce the power consumption. Similarly, in the above, an example in which the reception control section 207 causes the PD 2036 to start up and causes the LD 2036 to stop is described. However, the reception control section 207 may also cause the whole of the frame reception section 203 to start up and cause the whole of the frame reception section 203 to stop.

Although, for example, in the above the frame generation section 1032, the encoder 1033, the P/S 1034, the cumulative time counter 1037, and the memory 1041 are provided individually for all the LDs 1036 connected to the transmission paths 303-1 to 303-M, some or all of the frame generation section 1032, the encoder 1033, the P/S 1034, the cumulative time counter 1037, and the memory 1041 may be shared between these LDs 1036.

Similarly, although in the above the signal acquisition section 2032, the decoder 2033, and the S/P 2034 are provided individually for all the PDs 2036 connected to the transmission paths 303-1 to 303-M, some or all of the signal acquisition section 2032, the decoder 2033, and the S/P 2034 may be shared between these PDs 2036.

Further, for example, each of the generation section 101, the division section 102, the transmission path determination section 105A (105B), the sending control section 108, the frame generation section 1032, the encoder 1033, the LDD 1035, the cumulative time counter 1037, and the memory 1041 may be mounted on a separate integrated circuit (IC), or a combination of any two or more of these may be mounted on the same IC. Further, for example, each of the synthesis section 202, the reception control section 207, the signal acquisition section 2032, the decoder 2033, the S/P 2034, and the amplifier 2035 may be mounted on a separate IC, or a combination of any two or more of these may be mounted on the same IC.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A sending control apparatus including:

(1)

a transmission path determination section configured to determine, from a plurality of transmission paths connected to different sending sections, respectively, one or more sending transmission paths configured to transmit one or a plurality of transmission object signals, respectively, obtained from sending data, on a basis of the number of sending transmission paths and prescribed information; and a sending control section configured to control the sending section connected to the sending transmission path so that the transmission object signal is sent via the sending transmission path.

(2)

The sending control apparatus according to (1), in which the sending control section starts up the sending section connected to the sending transmission path among the plurality of transmission paths, and allows the sending section connected to a transmission path different from the sending transmission path to remain stopped.

(3)

The sending control apparatus according to (1) or (2), including:

a frame generation section configured to generate one or a plurality of frames each individually including the transmission object signal.

(4)

The sending control apparatus according to any one of (1) to (3), including:

a division section configured to obtain the one or plurality of transmission object signals from the sending data on a basis of the number of sending transmission paths.

(5)

The sending control apparatus according to (4), in which the division section outputs the transmission object signals to lanes leading to different ones of the sending transmission paths, respectively.

(6)

The sending control apparatus according to (4) or (5), in which the division section calculates the number of sending transmission paths on a basis of a transmission rate of the sending data and a transmission capacity per one of the plurality of transmission paths.

(7)

The sending control apparatus according to any one of (1) to (6), in which the transmission path determination section determines the sending transmission path from the plurality of transmission paths in a case where the sending data are determined as a sending object.

(8)

The sending control apparatus according to any one of (1) to (6), in which the transmission path determination section determines the sending transmission path from the plurality of transmission paths in a case where the number of sending transmission paths has changed.

(9)

The sending control apparatus according to (1), including:

an information sending section configured to send identification information of the sending transmission path to a receiver of the transmission object signal.

(10)

The sending control apparatus according to any one of (1) to (9), in which the transmission path determination section determines the sending transmission path from the plurality of transmission paths on a basis of the number of sending transmission paths and a cumulative time it has taken for the sending section connected to each of the plurality of transmission paths to perform data sending.

(11)

The sending control apparatus according to (10), in which the transmission path determination section determines, as the sending transmission path, one or a plurality of selected transmission paths equal to the number of sending transmission paths in ascending order of the cumulative time of the sending section from the plurality of transmission paths.

(12)

The sending control apparatus according to (10) or (11), including:

a memory configured to store the cumulative time for each of the sending sections.

(13)

The sending control apparatus according to (12), including:

a cumulative time counter configured to measure the cumulative time and record the cumulative time on the memory.

(14)

The sending control apparatus according to any one of (1) to (9), in which the transmission path determination section determines the sending transmission path from the plurality of transmission paths on a basis of an equal number of generated random numbers to the number of sending transmission paths.

(15)

A sending control method including:

determining, from a plurality of transmission paths connected to different sending sections, respectively, one or more sending transmission paths configured to transmit one or a plurality of transmission object signals, respectively, obtained from sending data, on a basis of the number of sending transmission paths and prescribed information; and controlling the sending section connected to the sending transmission path so that the transmission object signal is sent via the sending transmission path.

(16)

A signal synthesis apparatus including:

a signal acquisition section configured to acquire one or a plurality of transmission object signals that are obtained from sending data and are sent via one or more sending transmission paths each of which is configured to transmit the transmission object signal and is determined from a plurality of transmission paths connected to different sending sections, respectively, on a basis of the number of sending transmission paths and prescribed information if the one or plurality of transmission object signals are received; and a synthesis section configured to restore the sending data on a basis of the one or plurality of transmission object signals.

(17)

The signal synthesis apparatus according to (16), including:

an information reception section configured to receive identification information of the sending transmission path from a sender of the transmission object signal; and a reception control section configured to start up a reception section connected to the sending transmission path identified by the identification information among the plurality of transmission paths and to allow a reception section connected to a transmission path different from the sending transmission path to remain stopped.

(18)
A signal synthesis method including:
acquiring one or a plurality of transmission object signals that are obtained from sending data and are sent via one or more sending transmission paths each of which is configured to transmit the transmission object signal and is determined from a plurality of transmission paths connected to different sending sections, respectively, on a basis of the number of sending transmission paths and prescribed information if the one or plurality of transmission object signals are received; and
restoring the sending data by synthesizing the one or plurality of transmission object signals.

(19)
A signal transmission system including:
a sending control apparatus including
a transmission path determination section configured to determine, from a plurality of transmission paths connected to different sending sections, respectively, one or more sending transmission paths configured to transmit one or a plurality of transmission object signals, respectively, obtained from sending data, on a basis of the number of sending transmission paths and prescribed information, and
a sending control section configured to control the sending section connected to the sending transmission path so that the transmission object signal is sent via the sending transmission path; and
a signal synthesis apparatus including
a signal acquisition section configured to acquire the one or plurality of transmission object signals if the one or plurality of transmission object signals are received, and
a synthesis section configured to restore the sending data by synthesizing the one or plurality of transmission object signals.

(20)
A signal transmission method including:
determining, from a plurality of transmission paths connected to different sending sections, respectively, one or more sending transmission paths configured to transmit one or a plurality of transmission object signals, respectively, obtained from sending data, on a basis of the number of sending transmission paths and prescribed information;
controlling the sending section connected to the sending transmission path so that the transmission object signal is sent via the sending transmission path;
acquiring the one or plurality of transmission object signals if the one or plurality of transmission object signals are received; and
restoring the sending data by synthesizing the one or plurality of transmission object signals.

REFERENCE SIGNS LIST 1A, 1B image transmission system
10A, 10B sender (sending control apparatus)
101 generation section
102 division section
103 frame sending section
105A, 105B transmission path determination section
106 cumulative time comparison section
107 random number generation section
108 sending control section
109 information sending section
1032 frame generation section
1033 encoder
1037 cumulative time counter
1041 memory
1035 LDD
20 receiver
201 display section
202 synthesis section
203 frame reception section
207 reception control section
209 information reception section
2032 signal acquisition section
2033 decoder
2035 amplifier
30 cable
303 transmission path
40 transmission path

The invention claimed is:

1. A sending control apparatus, comprising:
circuitry configured to:
obtain at least one transmission object signal from sending data;
determine at least one sending transmission path from a plurality of transmission paths based on prescribed information and a number of sending transmission paths of the plurality of transmission paths;
switch on a specific sending circuit of a plurality of sending circuits based on a connection of the specific sending circuit to the at least one sending transmission path;
control the plurality of sending circuits other than the specific sending circuit to remain switched off; and
control transmission of the at least one transmission object signal via the at least one sending transmission path based on the switch on of the specific sending circuit.

2. The sending control apparatus according to claim 1, wherein
the circuitry is further configured to generate at least one frame, and
the at least one frame includes the at least one transmission object signal.

3. The sending control apparatus according to claim 1, wherein the circuitry is further configured to obtain the at least one transmission object signal from the sending data based on the number of sending transmission paths.

4. The sending control apparatus according to claim 3, wherein
the circuitry is further configured to output the at least one transmission object signal to at least one lane, and
the at least one lane is associated with the at least one sending transmission path.

5. The sending control apparatus according to claim 3, wherein the circuitry is further configured to calculate the number of sending transmission paths based on a transmission rate of the sending data and a transmission capacity of each of the plurality of transmission paths.

6. The sending control apparatus according to claim 1, wherein the circuitry is further configured to determine the at least one sending transmission path from the plurality of transmission paths based on a determination of the sending data as a sending object.

7. The sending control apparatus according to claim 1, wherein the circuitry is further configured to determine the at least one sending transmission path from the plurality of transmission paths based on a change of the number of sending transmission paths.

8. The sending control apparatus according to claim 1, wherein the circuitry is further configured to transmit identification information of the at least one sending transmission path to a receiver that receives the at least one transmission object signal.

9. The sending control apparatus according to claim 1, wherein
the circuitry is further configured to determine the at least one sending transmission path from the plurality of transmission paths based on a number of generated random numbers, and
the number of generated random numbers is equal to the number of sending transmission paths.

10. A sending control method, comprising:
obtaining at least one transmission object signal from sending data;
determining at least one sending transmission path from a plurality of transmission paths based on prescribed information and a number of sending transmission paths of the plurality of transmission paths;
switching on a specific sending circuit of a plurality of sending circuits based on a connection of the specific sending circuit to the at least one sending transmission path;
controlling the plurality of sending circuits other than the specific sending circuit to remain switched off; and
controlling transmission of the at least one transmission object signal via the at least one sending transmission path based on the switch on of the specific sending circuit.

11. A signal synthesis apparatus, comprising:
circuitry configured to:
receive identification information of at least one sending transmission path of a plurality of transmission paths from a sender of at least one transmission object signal;
switch on a specific reception circuit, of a plurality of reception circuits, connected to the at least one sending transmission path, wherein the specific reception circuit is switched on based on the identification information;
control the plurality of reception circuits other than the specific reception circuit to remain switched off;
acquire, via the at least one sending transmission path, the at least one transmission object signal based on the switch on of the specific reception circuit connected to the at least one sending transmission path, wherein
the sender obtains the at least one transmission object signal from sending data, and
the at least one sending transmission path is determined from the plurality of transmission paths based on prescribed information and a number of sending transmission paths of the plurality of transmission paths; and
restore the sending data based on the at least one transmission object signal.

12. A signal synthesis method, comprising:
receiving identification information of at least one sending transmission path of a plurality of transmission paths from a sender of at least one transmission object signal;
switching on a specific reception circuit, of a plurality of reception circuits, connected to the at least one sending transmission path, wherein the specific reception circuit is switched on based on the identification information;
controlling the plurality of reception circuits other than the specific reception circuit to remain switched off;
acquiring, via the at least one sending transmission path, the at least one transmission object signal based on the switch on of the specific reception circuit connected to the at least one sending transmission path, wherein
the sender obtains the at least one transmission object signal from sending data, and
the at least one sending transmission path is determined from the plurality of transmission paths based on prescribed information and a number of sending transmission paths of the plurality of transmission paths; and
restoring the sending data by synthesizing the at least one transmission object signal.

13. A signal transmission system, comprising:
a sending control apparatus including:
first circuitry configured to:
obtain at least one transmission object signal from sending data;
determine at least one sending transmission path from a plurality of transmission paths based on prescribed information and a number of sending transmission paths of the plurality of transmission paths;
switch on a specific sending circuit of a plurality of sending circuits based on a connection of the specific sending circuit to the at least one sending transmission path;
control the plurality of sending circuits other than the specific sending circuit to remain switched off; and
control transmission of the at least one transmission object signal via the at least one sending transmission path based on the switch on of the specific sending circuit; and
a signal synthesis apparatus including:
second circuitry configured to:
acquire the at least one transmission object signal via the at least one sending transmission path; and
restore the sending data by synthesis of the at least one transmission object signal.

14. A signal transmission method, comprising:
obtaining, by first circuitry, at least one transmission object signal from sending data;
determining, by the first circuitry, at least one sending transmission path from a plurality of transmission paths based on prescribed information and a number of sending transmission paths of the plurality of transmission paths;
switching on, by the first circuitry, a specific sending circuit of a plurality of sending circuits based on a connection of the specific sending circuit to the at least one sending transmission path;
controlling, by the first circuitry, the plurality of sending circuits other than the specific sending circuit to remain switched off;
controlling, by the first circuitry, transmission of the at least one transmission object signal via the at least one sending transmission path based on the switch on of the specific sending circuit;
acquiring, by second circuitry, the at least one transmission object signal via the at least one sending transmission path; and
restoring, by the second circuitry, the sending data by synthesizing the at least one transmission object signal.

* * * * *